United States Patent [19]

Hagan

[11] Patent Number: 5,369,993

[45] Date of Patent: Dec. 6, 1994

[54] THREE AXIS AIR DATA SYSTEM FOR AIR VEHICLES

[75] Inventor: Floyd W. Hagan, Eden Prairie, Minn.

[73] Assignee: The B. F. Goodrich Company, Akron, Ohio

[21] Appl. No.: 85,294

[22] Filed: Jun. 30, 1993

[51] Int. Cl.$^5$ .............................................. G01C 21/00
[52] U.S. Cl. ..................................... 73/178 R; 73/180
[58] Field of Search .................. 73/180, 178 R, 178 T, 73/189, 861.65, 182, 183

[56] References Cited

U.S. PATENT DOCUMENTS

| | | | |
|---|---|---|---|
| 2,661,624 | 12/1953 | Bechberger et al. | 73/180 |
| 2,923,152 | 2/1960 | Mabry, Jr. et al. | 73/182 |
| 3,222,926 | 12/1965 | Carver | 73/180 |
| 3,244,001 | 4/1966 | Pettingall | 73/180 |
| 3,646,811 | 3/1972 | DeLeo et al. | 73/182 |
| 4,074,570 | 2/1978 | Beilman et al. | 73/182 |
| 4,088,019 | 5/1978 | Mascia | 73/180 |
| 4,235,104 | 11/1980 | Hoadley et al. | 73/180 |
| 4,378,696 | 4/1983 | DeLeo et al. | 73/180 |
| 4,522,070 | 6/1985 | Hagen | 73/384 |
| 4,718,273 | 1/1988 | McCormack | 73/180 |
| 4,836,019 | 6/1989 | Hagen et al. | 73/180 |
| 4,843,880 | 7/1989 | Sommer | 73/189 |
| 5,117,687 | 6/1992 | Gerardi | 73/170 |

Primary Examiner—Richard E. Chilcot, Jr.
Assistant Examiner—William L. Oen
Attorney, Agent, or Firm—Westman, Champlin & Kelly

[57] ABSTRACT

An apparatus senses a free stream flow parameter using airflow adjacent an air vehicle. The apparatus includes a first sensor sensing a longitudinal axial component and a lateral axial component of a parameter of local airflow immediately adjacent the first sensor. A second sensor senses a longitudinal axial component and a second axial component perpendicular to the lateral axial component sensed by the first sensor of a parameter of local airflow immediately adjacent the second sensor. The first and second sensors are mounted on the air vehicle such that a longitudinal axis of the first sensor lies in a first plane including a longitudinal axis and a longitudinal axis of the second sensor means lies in a second plane substantially perpendicular to the first plane and including the longitudinal axis of the first plane. A correction unit obtains a signal representing the free stream flow parameter as a function of the parameter components sensed by the first and second sensors.

20 Claims, 13 Drawing Sheets

THREE AXIS AIR DATA SYSTEM FOR AIR VEHICLES

BACKGROUND OF THE INVENTION

The present invention relates generally to air data sensing systems, and, in particular, to air data sensing systems which sense air data parameters on highly maneuverable air vehicles.

A variety of air data sensors exist which sense various air data parameters such as airflow velocity and direction, air vehicle angle-of-attack and angle-of-sideslip, and static pressure. For example, orthogonal air speed sensors which are capable of measuring local flow velocities through 360° of flow direction, which occurs when the sensors are mounted on the nose of a helicopter, are described in U.S. Pat. Nos. 3,646,811 and 4,522,070, which are assigned to the assignee of the present application and are herein incorporated by reference. High performance fighter aircraft operate through a range of attack and sideslip which can be measured by a more conventional L-shaped multiple output pitot-static-flow angle air data sensors.

Typically, air data sensors are positioned on the surface of the fuselage of an air vehicle. The air data sensors measure local airflow conditions dependent on the mounting location and the shape of the air vehicle. Local flow parameters such as local flow velocity magnitude and direction typically vary significantly from the free stream flow conditions. Thus, an air data sensing system is desired that obtains complete air data parameters indicative of the free stream flow conditions.

SUMMARY OF THE INVENTION

The present invention relates to an apparatus on board an air vehicle for sensing a free stream flow parameter when mounted adjacent the air vehicle. A first sensor senses a longitudinal axial component and a lateral axial component of a parameter of local airflow immediately adjacent the first sensor and provides output signals as a function of the local longitudinal and lateral components. The first sensor is mounted on the air vehicle such that a longitudinal axis of the first sensor lies in a first reference plane including a reference longitudinal axis. A second sensor also senses a longitudinal axial component of the airflow parameter and also a second axial component of the airflow parameter in a direction substantially perpendicular to the lateral axial component sensed by the first sensor. The sensors provide output signals as a function of the local longitudinal and axial components of the airflow parameter being measured. The second sensor is mounted on the air vehicle such that a longitudinal axis of the second sensor means lies in a second plane substantially perpendicular to the first plane and including the reference longitudinal axis of the first plane which is at a known relation to a longitudinal reference axis of the air vehicle. A correction unit obtains a signal representing the free stream flow parameter as a function of the output signals from the first and second sensors.

DETAILED DESCRIPTION OF THE PREFERRED EMBODIMENTS

Figure 1:
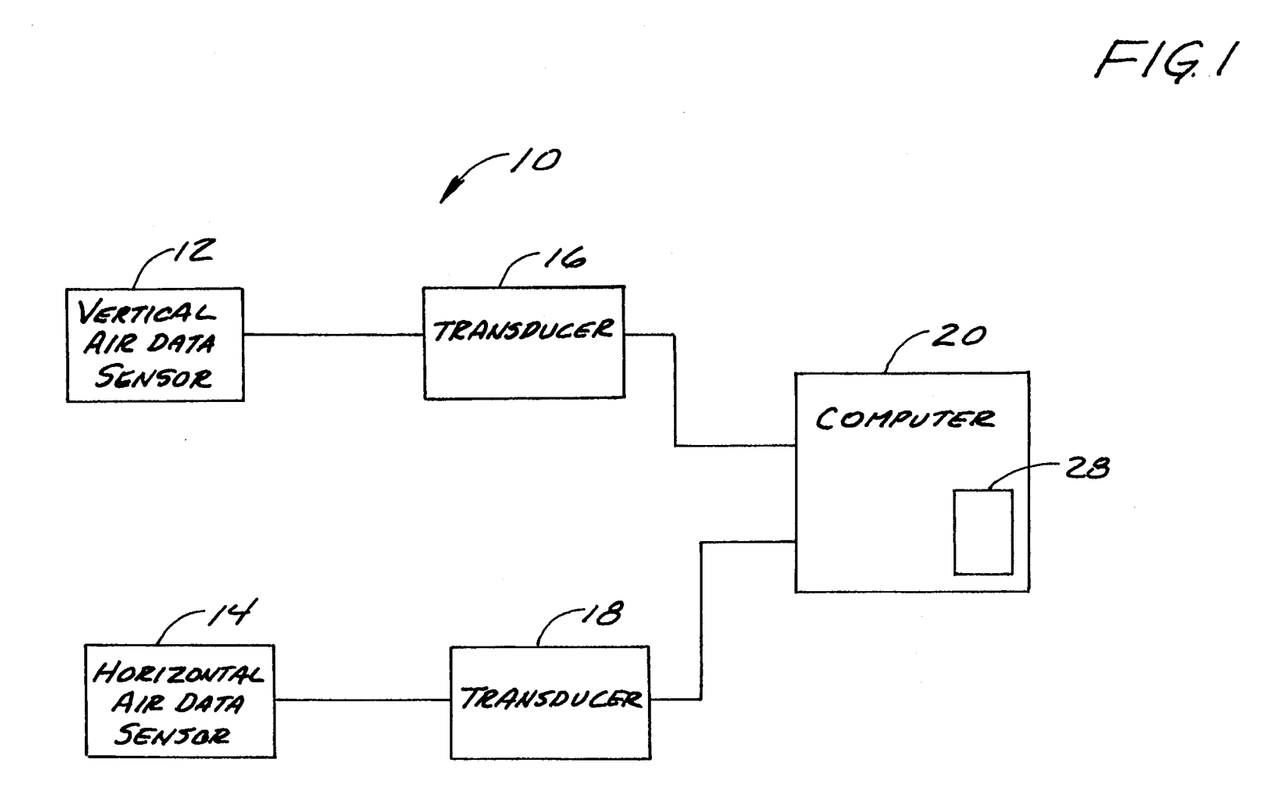
FIG. 1 is a block diagram of a sensing system for sensing free stream flow parameters adjacent an air vehicle according to the present invention.

A sensing system 10 illustrated schematically in FIG. 1 senses free stream flow parameters utilizing airflow adjacent an air vehicle. System 10 is on board an air vehicle, and obtains complete three axis air data parameters from the airflow over the air vehicle.

Figure 2:
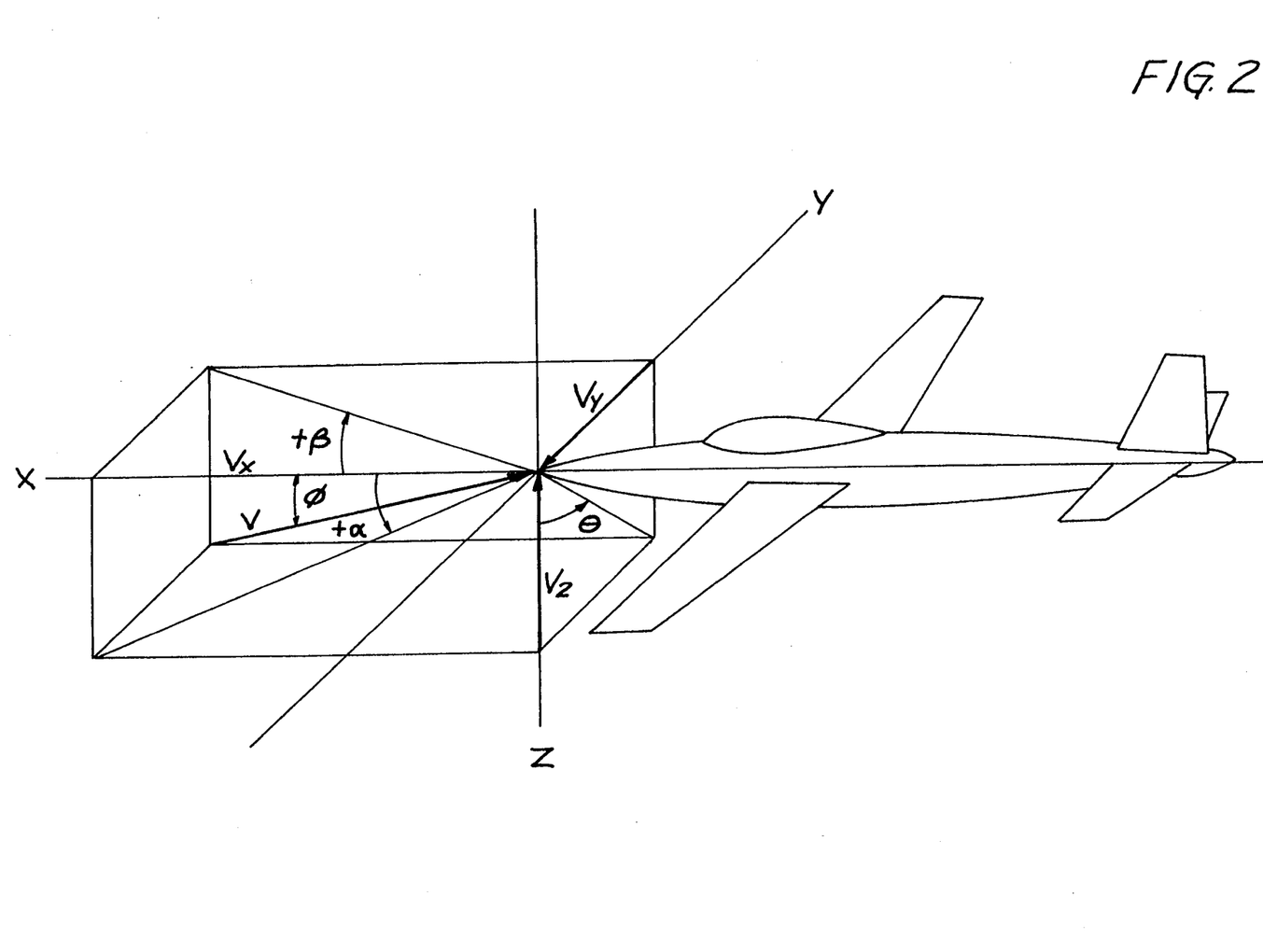
FIG. 2 is a graphical representation of the standard velocity vector notation for air vehicles.

FIG. 2 illustrates standard velocity vector notation for air vehicles showing the three axis coordinates, including the X, Y, and Z axes, where:

V = resultant velocity flow vector
$V_x$ = longitudinal velocity component along the X axis
$V_y$ = lateral velocity component along the Y axis
$V_z$ = vertical velocity component along the Z axis
$\alpha$ = angle of attack (measured in X-Z plane)
$\beta$ = angle of sideslip (assumed) (technically sidewash angle because measured in X-Y plane)
$\phi$ = resultant flow angle
$\Theta$ = vector rotational angle
$\tan \alpha = \tan \phi \cos \Theta$
$\tan \beta = \tan \phi \sin \Theta$ The three air vehicle calibrated air speed components ($V_{cx}$), ($V_{cy}$), and ($V_{cz}$), the resultant calibrated air speed ($V_c$), and the air vehicle angle of attack ($\alpha$) and angle of sideslip ($\beta$) are all useful air data parameters used for aircraft flight control and weapons delivery. Thus, sensing system 10 is used to measure these air data parameters. In addition, sensing system 10 is used to measure the true static pressure (p) of the free stream airflow over the air vehicle.

Referring to FIG. 1, a first vertical air data sensor 12 senses local longitudinal (along the X axis) and lateral (along the Y axis) components of a parameter of local airflow immediately adjacent the vertical air data sensor. A second horizontal air data sensor 14 senses the local longitudinal (along the X axis) and vertical (along the Z axis) components of the parameter of local airflow immediately adjacent the horizontal data sensor. A transducer 16 receives the sensed local longitudinal and lateral parameter components sensed by sensor 12 and generates separate electrical signals, each as a function of one of the components. Likewise, a transducer 18 receives the local longitudinal and vertical parameter components sensed by the sensor 14 and generates separate electrical signals each as a function of one of the components. A computer 20 receives the electrical signals from transducer 16 and transducer 18. Computer 20 is typically either the flight control or flight management computer on board the air vehicle. Computer 20 could, however, be implemented in a separate microprocessor or in a processor chip built into the transducers. Computer 20 calculates a signal representing the free stream flow parameter such as air speed having a longitudinal axial component, a lateral axial component, and a vertical axial component as a function of the signals from transducers 16 and 18.

Figure 3:
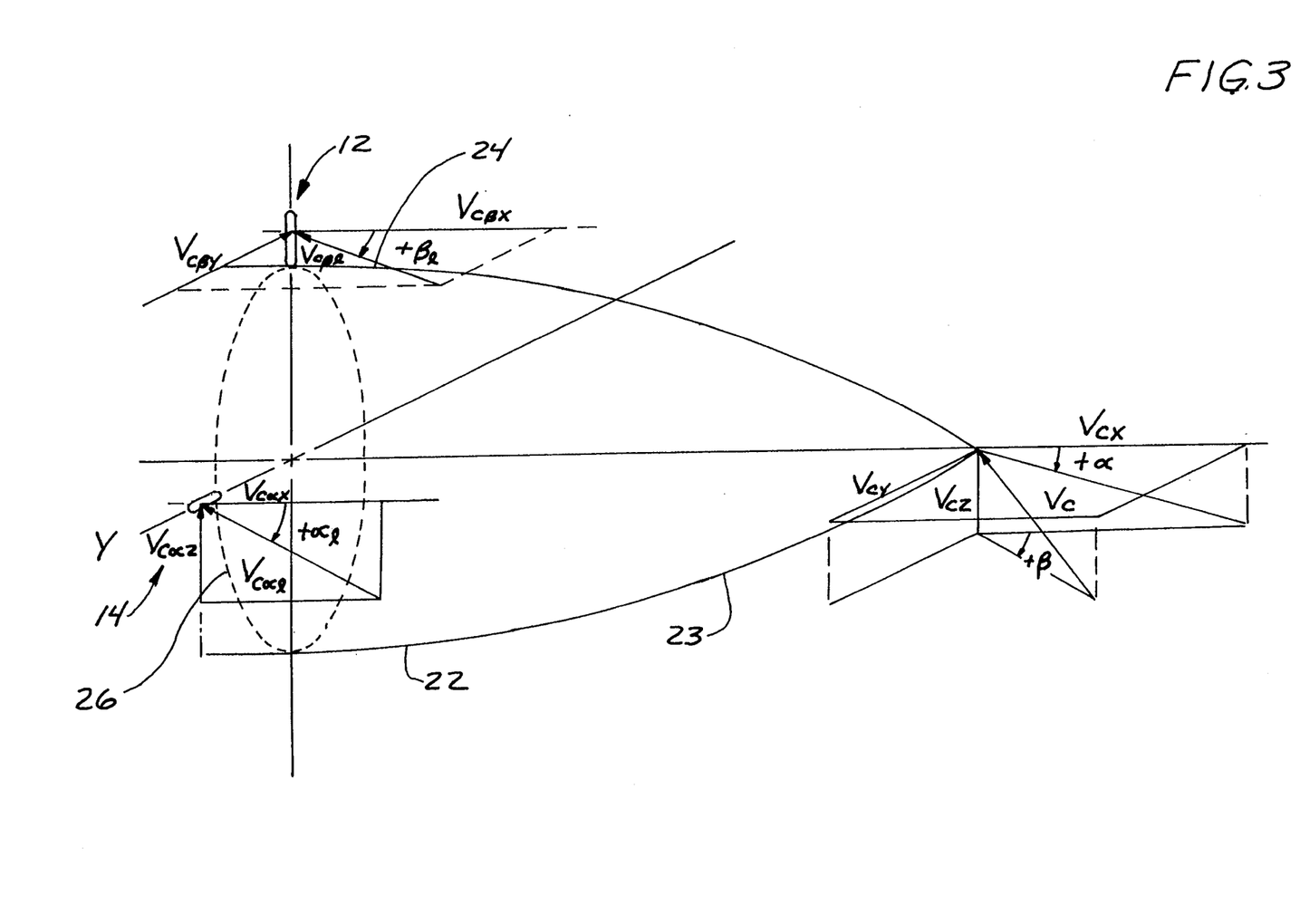
FIG. 3 is a schematic side view diagram showing the approximate mounting locations of sensors utilized in the sensing system of FIG. 1.

The typical orientation of sensors 12 and 14 mounted on an air vehicle 22 is illustrated in FIG. 3. As indicated in FIG. 3, the two sensors lie in intersecting planes that are substantially perpendicular to each other and which include a common longitudinal axis at the intersection of the planes. In most applications, the sensors are mounted close to the air vehicle fuselage nose indicated at 23. The vertical air data sensor 12 is typically mounted on a mounting surface 24 either on the top or the bottom of the fuselage and near the vertical center line of the air vehicle, indicated by the Z axis. As illustrated, the horizontal air data sensor 14 is mounted at a radial location approximately 90° from the vertical data sensor 12 either on the right or left side of the fuselage, on a mounting surface 26. The air vehicle 22 blocks airflow to the vertical sensor from the vertical direction behind mounting surface 24. The air vehicle blocks airflow to the horizontal sensor 14 from the lateral direction behind mounting surface 26. Thus, vertical sensor 12 is open to receive airflow from the longitudinal and lateral directions, and the horizontal sensor 14 is open to receive airflow from the longitudinal and vertical directions. Consequently, the vertical sensor 12 measures local longitudinal and lateral components of air speed represented as ($V_{c\beta x}$) and ($V_{c\beta y}$), respectively. The resultant local flow velocity ($V_{c\beta l}$) and local angle of sideslip flow direction ($\beta_l$) are calculated as a function of the local longitudinal and lateral components of air speed. The horizontal sensor 14 measures local longitudinal and vertical components of air speed represented as ($V_{c\alpha x}$) and ($V_{c\alpha c}$), respectively. The resultant local flow velocity ($V_{cal}$) and local angle of attack flow direction ($\alpha_l$) are calculated as a function of the local longitudinal and vertical components of air speed.

The sensors 12 and 14 are implemented with a variety of air data sensors depending on the application. Sensors 12 and 14 sense various air data parameters such as airflow velocity and direction, air vehicle angle-of-attack and angle-of-sideslip, and static pressure. For instance in some applications an orthogonal air speed sensor is desired such as is described in the U.S. Pat. Nos. 3,646,811 and 4,522,070. An orthogonal airspeed sensor measures local flow velocities through 360° of flow direction which occurs when the sensors are mounted on the nose of a helicopter. A more limited actual operating range of angle of attack and angle of sideslip permits sensors 12 and 14 to be more conventional L-shaped multiple output pitot-static-flow angle air data sensors such as the air data sensors described in U.S. Pat. Nos. 3,318,146; 4,096,744; 4,378,696; and 4,836,019.

Because air data sensors 12 and 14 are located on the aircraft fuselage surfaces 24 and 26, the sensors measure local flow conditions which are dependent on the mounting location and shape of air vehicle 22. The local flow velocity magnitude and direction measured typically vary significantly from the free stream flow conditions encountered by air vehicle 22. Therefore, the electrical signals from transducers 16 and 18 representing the measured outputs of sensors 12 and 14 are combined and corrected in computer 20 to obtain actual air vehicle flight parameters. The necessary corrections performed by computer 20 to obtain the true flight conditions from the local air data are illustrated graphically in FIGS. 4–11.

Figure 4:
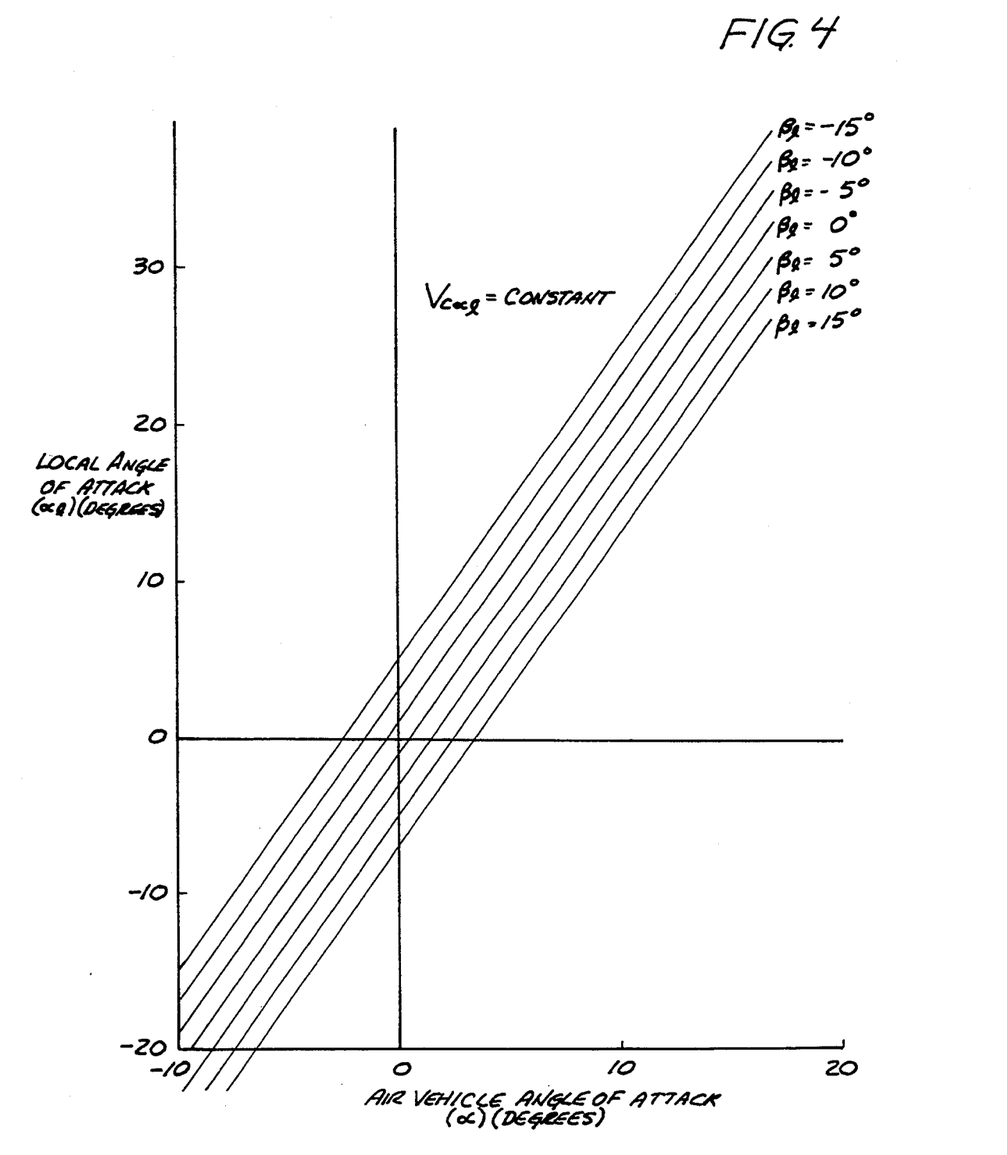
FIG. 4 is a graphical representation of the derivation of air vehicle angle of attack as a function of known local airflow parameters for the sensing system of FIG. 1.

FIG. 4 illustrates that the air vehicle angle of attack ($\alpha$) can be calculated from the functional relationship between the local angle of attack ($\alpha_l$) measured by the horizontal sensor 14 and the local angle of sideslip ($\beta_l$) measured by the vertical sensor 12 when a constant resultant local flow velocity $V_{cal}$ is assumed. The limited ranges of $\alpha_l$ and $\beta_l$ represented in FIG. 2 are representative of local flow limits of certain air vehicles such as conventional aircraft and helicopters operating at a high forward velocity. However, for certain applications such as helicopters flying at low velocities, $\alpha_l$ and $\beta_l$ each range from 0° to 360°. In addition, the local air speed ($V_{cal}$) measured by horizontal sensor 14 is typically not constant. Instead, $\alpha$ has a secondary dependency upon $V_{cal}$, which could be represented in a series of graphs to illustrate the complete flight range for possible values of $V_{cal}$. Computer 20 provides corrections for $V_{cal}$ in a three-dimensional matrix or look-up table which defines aircraft angle of attack ($\alpha$) in terms of all three independent variables $\alpha_l$, $\beta_l$, and $V_{cal}$. The three-dimensional look-up table is stored in a large memory which is typically contained in the flight control or flight management computer indicated at 28 in FIG. 1. The look up tables implement the information contained in the respective graphs shown in FIGS. 4–11.

Figure 5:
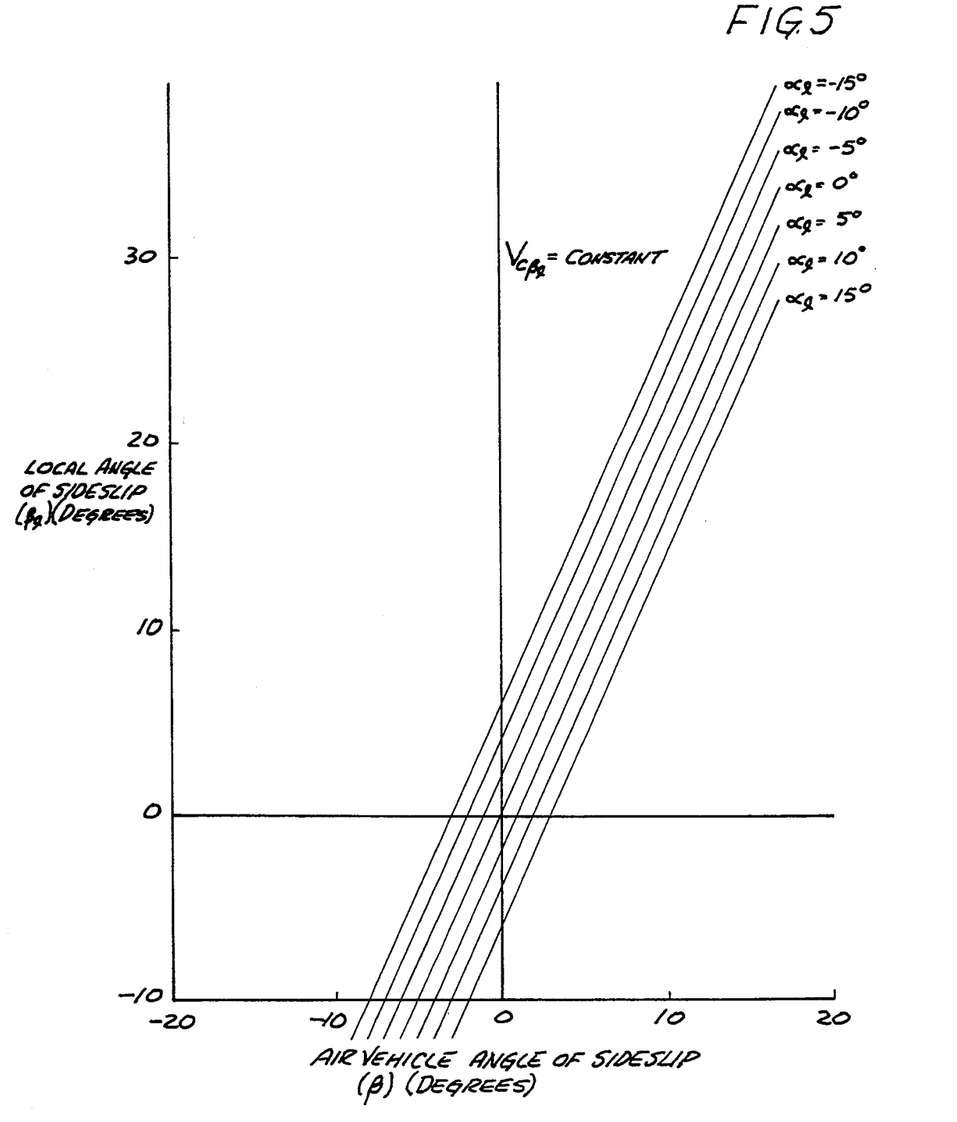
FIG. 5 is a graphical representation of the derivation of air vehicle angle of sideslip as a function of known local airflow parameters for the sensing system of FIG. 1.

Referring to FIG. 5, air vehicle angle of sideslip ($\beta$) is derived from the three independent variables $\alpha_l$ measured by the horizontal sensor 14, $\beta_l$ measured by the vertical sensor 12, and $V_{cal}$ measured by vertical sensor 12. As with FIG. 4, FIG. 5 illustrates only a limited range of $\alpha_l$ and $\beta_l$ for a constant local air speed. Thus, computer corrections for $V_{cal}$ are made in a known commonly use three-dimensional matrix or look-up table located in memory 28.

Figure 6:
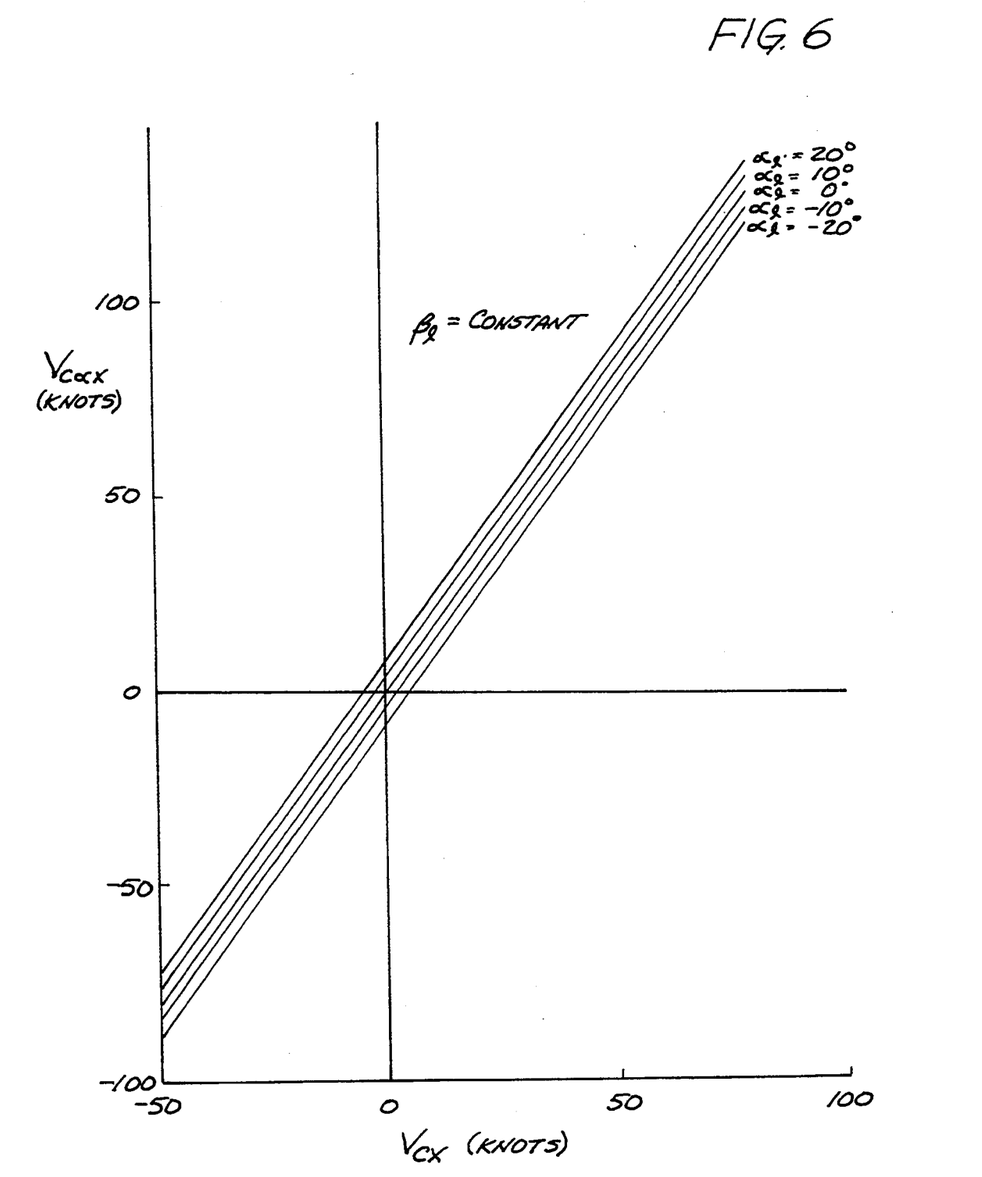
FIG. 6 is a graphical representation of the derivation of an air vehicle longitudinal component of airspeed ($V_{cx}$) as a function of known local airflow parameters for the sensing system of FIG. 1.
Figure 7:
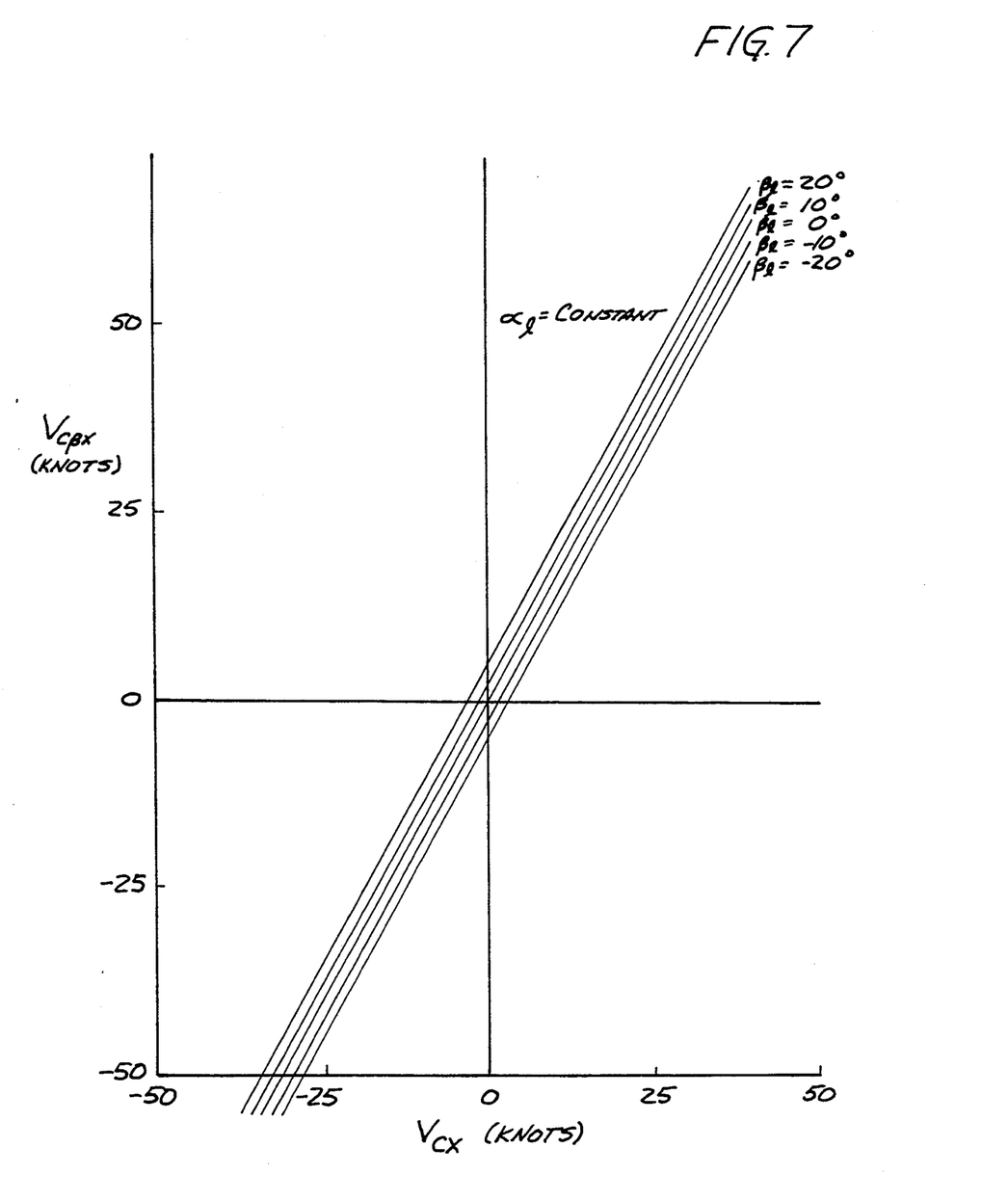
FIG. 7 is a graphical representation of the derivation of an air vehicle longitudinal component of airspeed ($V_{cx}$) as a function of known local airflow parameters for the sensing system of FIG. 1.

Local angle of attack $\alpha_l$ measured by the horizontal sensor 14 and the local angle of sideslip $\beta_l$ measured by the vertical sensor are also used to correct the measured velocity component $V_{cax}$ and $V_{c\beta x}$ to obtain the air vehicle axial component of velocity ($V_{cx}$). FIG. 6 illustrates the derivation of $V_{cx}$ as a function of $V_{cax}$, $\alpha_l$, and $\beta_l$. FIG. 7 illustrates the derivation of $V_{cx}$ as a function of $V_{c\beta x}$, $\alpha_l$, and $\beta_l$. Thus, two redundant measurements of $V_{cx}$ are obtainable. These two $V_{cx}$ measurements are useful for system redundancy on air vehicles. Optionally, the two $V_{cx}$ measurements are averaged by computer 20 to obtain maximum accuracy. As with FIGS. 4 and 5, FIGS. 6 and 7 are illustrated for only limited ranges of $\alpha_l$ and $\beta_l$ for clarity.

Figure 8:
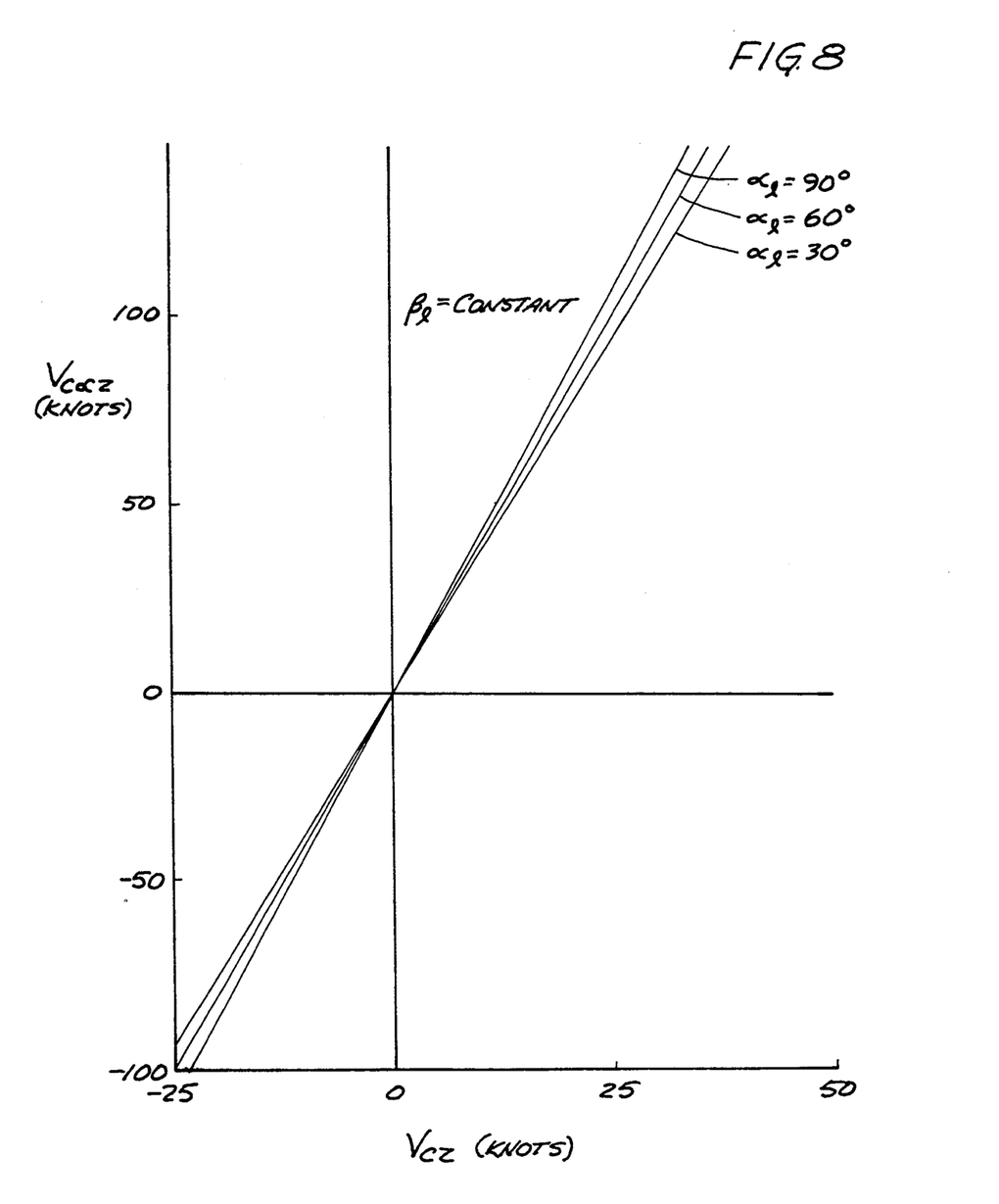
FIG. 8 is a graphical representation of the derivation of an air vehicle vertical component of airspeed ($V_{cz}$) as a function of known local airflow parameters for the sensing system of FIG. 1.
Figure 9:
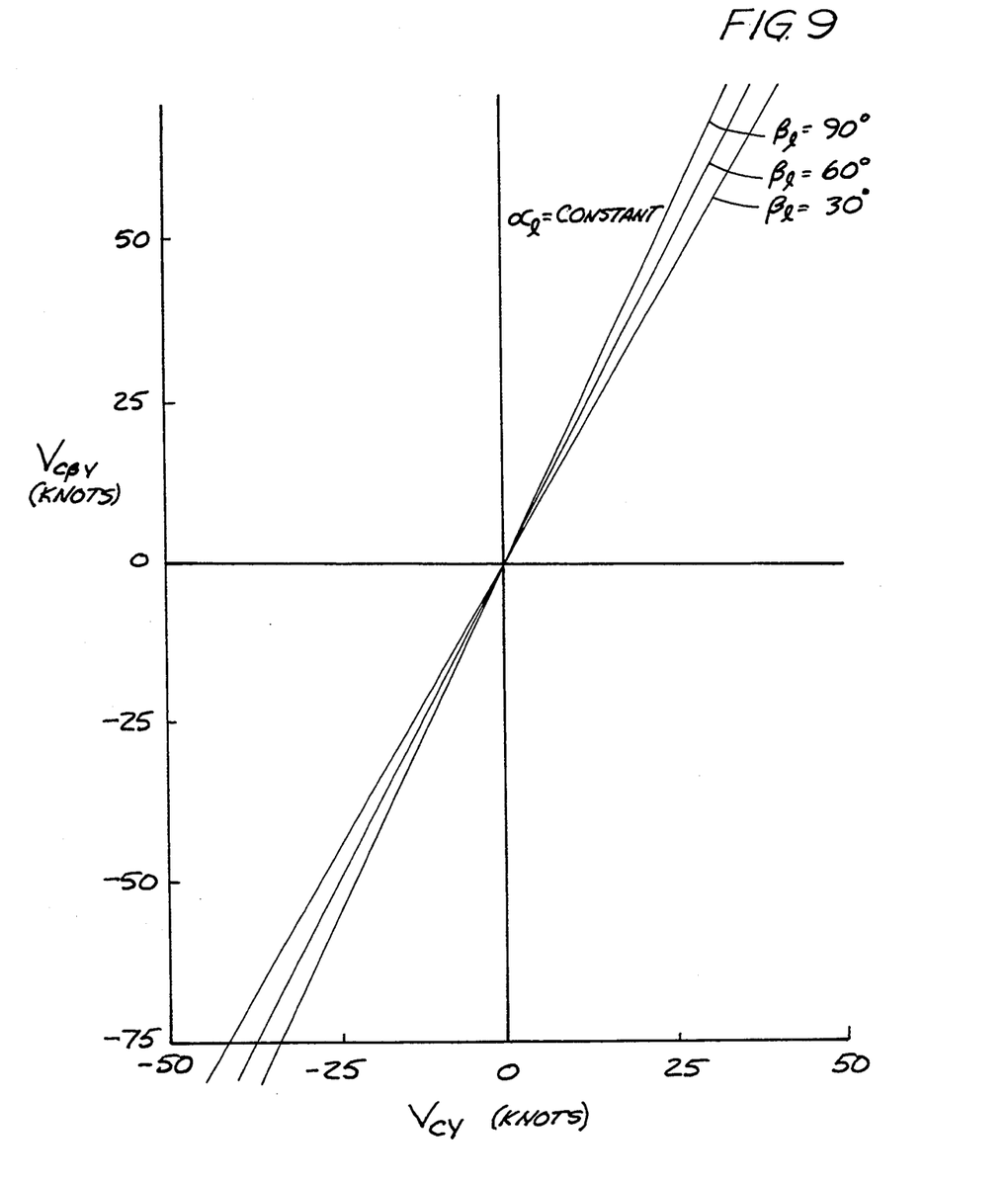
FIG. 9 is a graphical representation of the derivation of an air vehicle lateral component of airspeed ($V_{cy}$) as a function of known local airflow parameters for the sensing system of FIG. 1.
Figure 10:
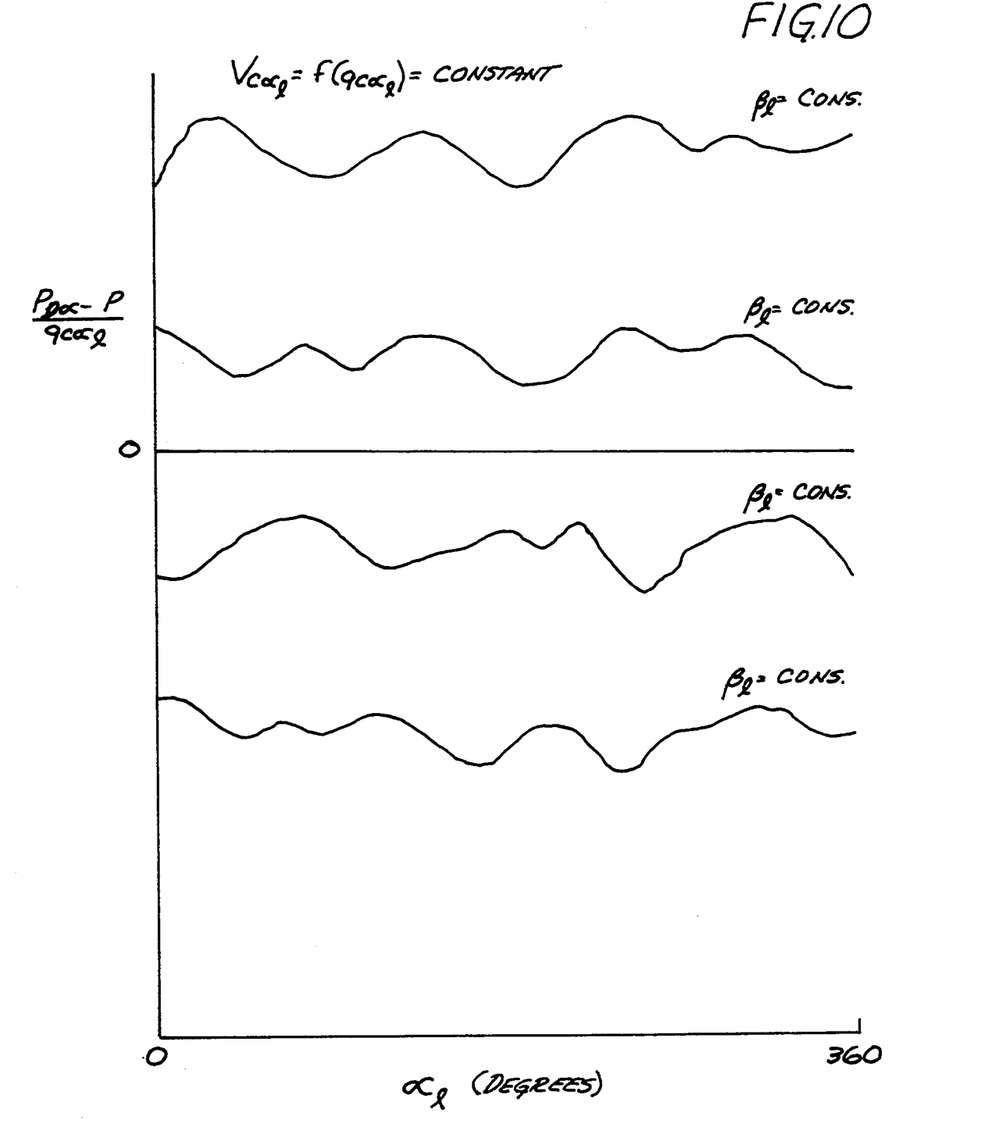
FIG. 10 is a graphical representation of the derivation of air vehicle true static pressure as a function of known local airflow parameters for the sensing system of FIG. 1.
Figure 11:
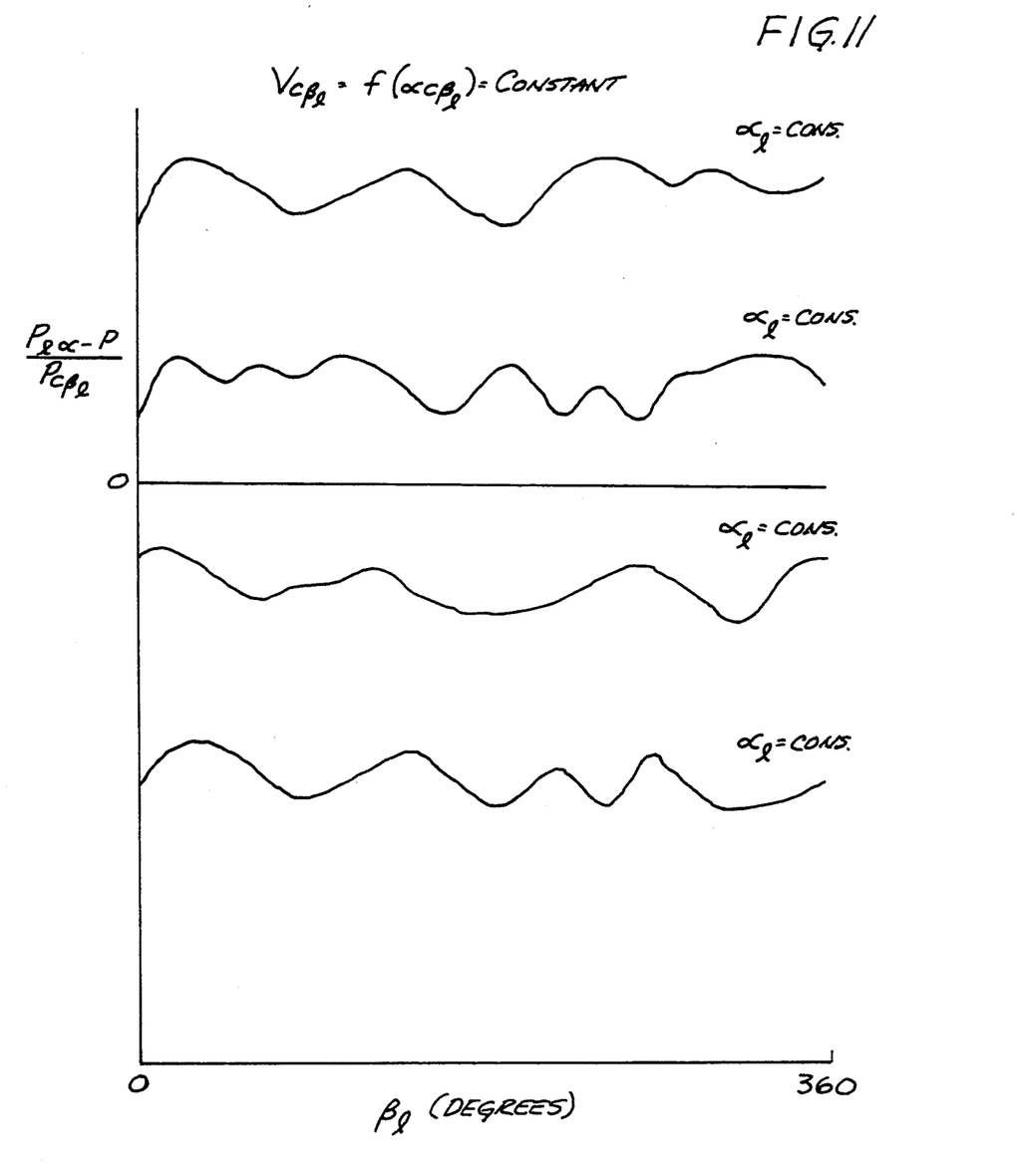
FIG. 11 is a graphical representation of the derivation of air vehicle true static pressure as a function of known local airflow parameters for the sensing system of FIG. 1.

The air vehicle vertical air speed component ($V_{cz}$) is derived from the three variables $\alpha_l$, $\beta_l$, and $V_{caz}$ as illustrated in FIG. 8. The lateral air speed component ($V_{cy}$) is derived as a function of the three variables $\alpha_l$, $\beta_l$, and $V_{c\beta y}$ as illustrated in FIG. 9. Again, the graphs of FIGS. 8 and 9 only illustrate limited ranges for $\alpha_l$ and $\beta_l$ but could include ranges from 0° to 360°.

As with the calculation of $\alpha$ and $\beta$, each of the computer correction tables of memory 28 for $V_{cx}$, $V_{cy}$ and $V_{cz}$ are implemented in three-dimensional look-up tables to account for varying $\alpha_l$ and $\beta_l$ angles which independent variables for each velocity component.

The vertical sensor 12 also measures local static pressure ($p_{l\beta}$) and the horizontal sensor 14 measures local static pressure ($p_{l\alpha}$). The local static pressure ($p_{l\alpha}$) is utilized along with $\alpha_l$, $\beta_l$, and $V_{cal}$ to derive true static pressure (p) according to the functional relationships illustrated in FIG. 10. Similarly, the local static pressure ($p_{l\beta}$) along with $\alpha_l$, $\beta_l$ and $V_{c\beta l}$ are used to derive true static pressure (p) according to the functional relationships illustrated in FIG. 11. In this way, two independent measurements of true static pressure (p) are obtainable. These two independent measurements are used for redundancy in separate user systems. Optionally, the two independent measurements are averaged for maximum accuracy. For L-shaped multi-function probes, the local air speed $V_{cl}$ is a function of local impact pressure represented by $q_{cl}=(p_{t'm}-p_m)$ where $p_{t'm}$ is measured pitot pressure and $p_m$ is measured static pressure. For the orthogonal air speed sensor, $q_{cl}$ is calculated from either $V_{c\beta l}$ which is derived from $V_{cx}$ and $V_{cy}$ for the vertical sensor 12 or from $V_{cal}$ which is derived from $V_{cx}$ and $V_{cz}$ measured by horizontal sensor 14.

The measured static pressure is easily obtained from the L-shaped multi-function air data sensor such as described in U.S. Pat. Nos. 4,378,696 and 4,836,019. Whereas for lower velocity applications such as with helicopters, the orthogonal air speed sensor is used to measure static pressure using the relationships fully described in U.S. Pat. No. 4,522,070.

Figure 12:
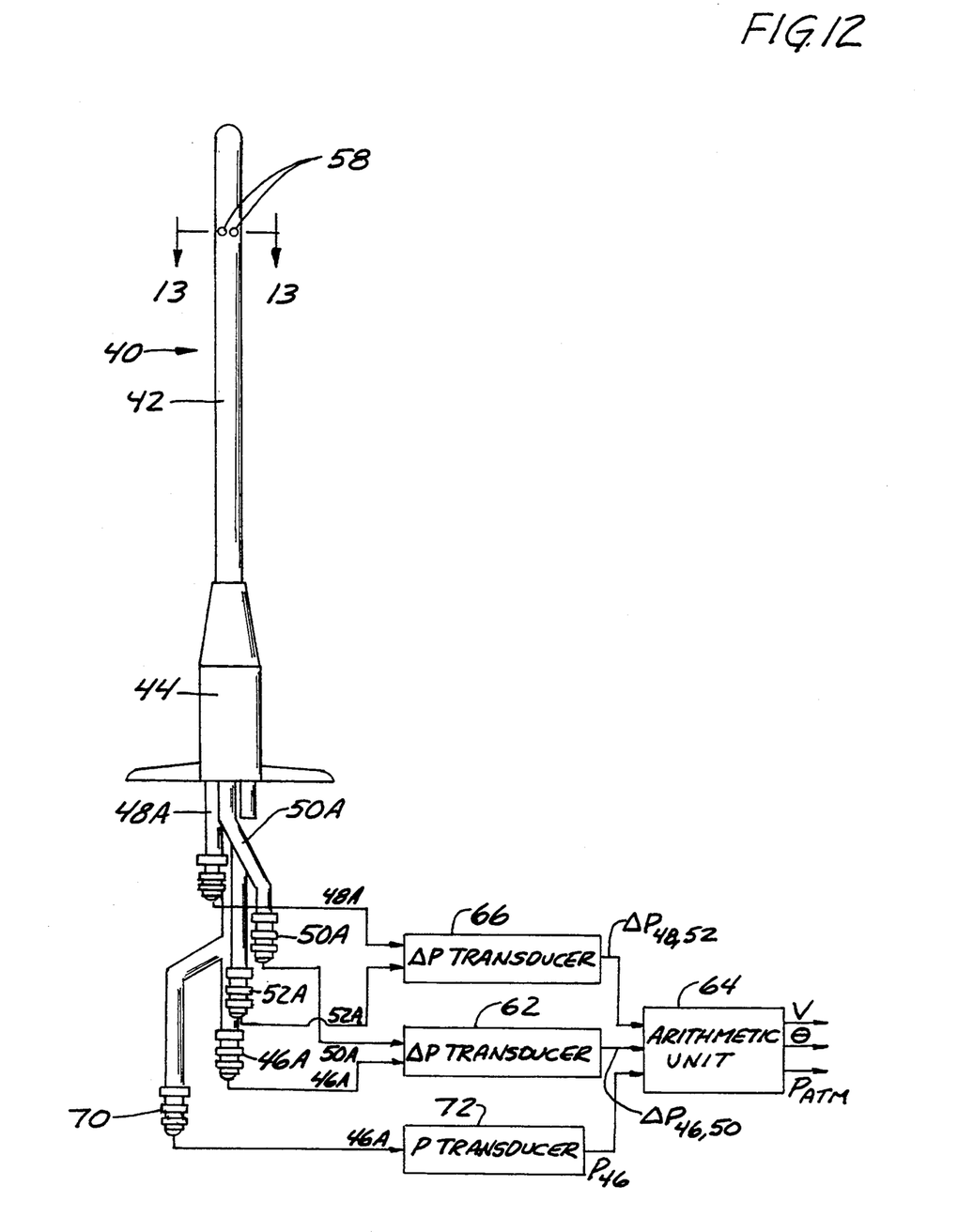
FIG. 12 is a schematic diagram of an orthogonal sensor utilized in an embodiment of the present invention.
Figure 13:
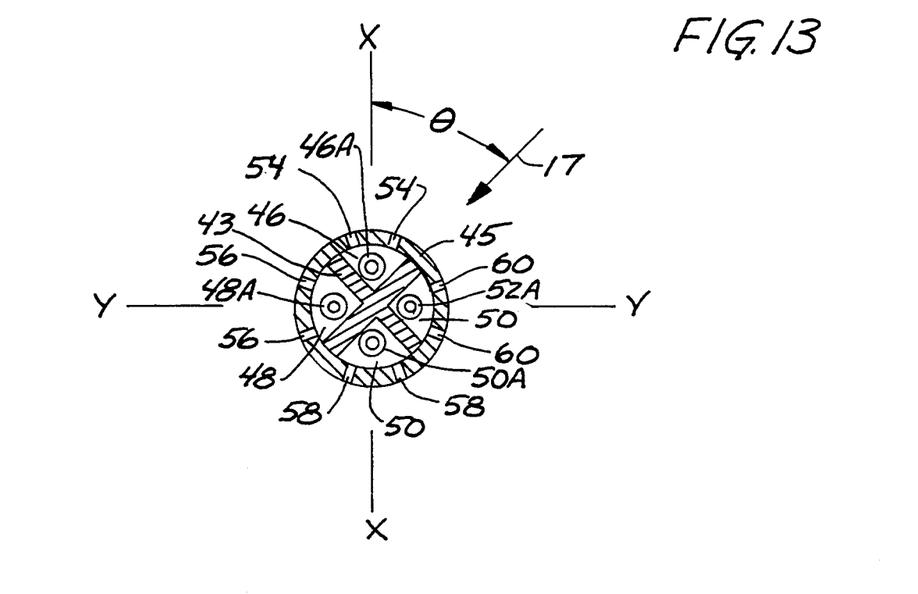
FIG. 13 is a sectional view taken along line 13—13 in FIG. 12.

A suitable orthogonal sensor which can be used for applications where $\alpha_l$ and $\beta_l$ range from 0° to 360° is illustrated in FIGS. 12 and 13. Such an orthogonal sensor is described in U.S. Pat. Nos. 3,646,811 and 4,522,070. A sensor 40 is comprised of housing 42 mounted in base 44. Housing 42 is an elongated tube closed at the end. As illustrated in FIG. 13, the interior of housing 42 is divided by longitudinal walls 43 and 45 into two chamber pairs. The chambers are numbered 46, 48, 50 and 52. The bisecting plane of chambers 46 and 50 lies on the X axis. The chambers 46 and 50 comprise an oppositely facing chamber pair. The bisecting plane of chambers 48 and 52 lies on the Y axis. Chambers 48 and 52 comprise an oppositely facing chamber pair.

Each chamber has pressure ports that pass through the wall of housing 42 and connect the respective chamber to the environment around sensor 40. Ports 54 open to chamber 46; ports 56 open to chamber 48; ports 58 open to chamber 50; and ports 60 open to chamber 52. Ports 54 face generally in opposite direction from ports 58 and ports 56 face generally in opposite direction from port 60. Tubes 46A, 48A, 50A, and 52A convey measured pressure signals from chambers 46, 48, 50 and 52, respectively.

The fluid velocity is derived according to the relationship $V=C$ $(\Delta P_{46,50}+\Delta P_{48,52})^{0.5}$ where V=fluid velocity, C is a calibration constant, $\Delta P_{46,50}$ is a pressure differential between chambers 46 and 50 and $\Delta P_{48,52}$ is a pressure differential between chambers 48 and 52. Accordingly, the pressure signals from chambers 46 and 50 are provided to differential pressure transducer 62. The output of transducer 62 is an electrical signal that is a function of the pressure differential between chambers 46 and 50. Such electrical signal is also fed to arithmetic unit 64. Pressure signals from chambers 48 and 52 are provided to differential pressure transducer 66. The output of transducer 66 is an electrical signal that is a function of the pressure differential between chambers 48 and 52. Such electrical signal is fed to arithmetic unit 64. Arithmetic unit 64 performs the arithmetic functions necessary to generate an electrical signal that is a function of fluid velocity. Optionally, computer 20 (shown in FIG. 1 ) can perform these arithmetic functions instead of arithmetic unit 64. FIG. 13 illustrates fluid vector 71. The direction of flow relative to X axis is shown by the angle $\theta$, which is derived by the relationship, $$\cos^2\theta = \frac{\Delta P_{46,50}}{\Delta P_{46,50} + \Delta P_{48,52}}$$

Figure 14:
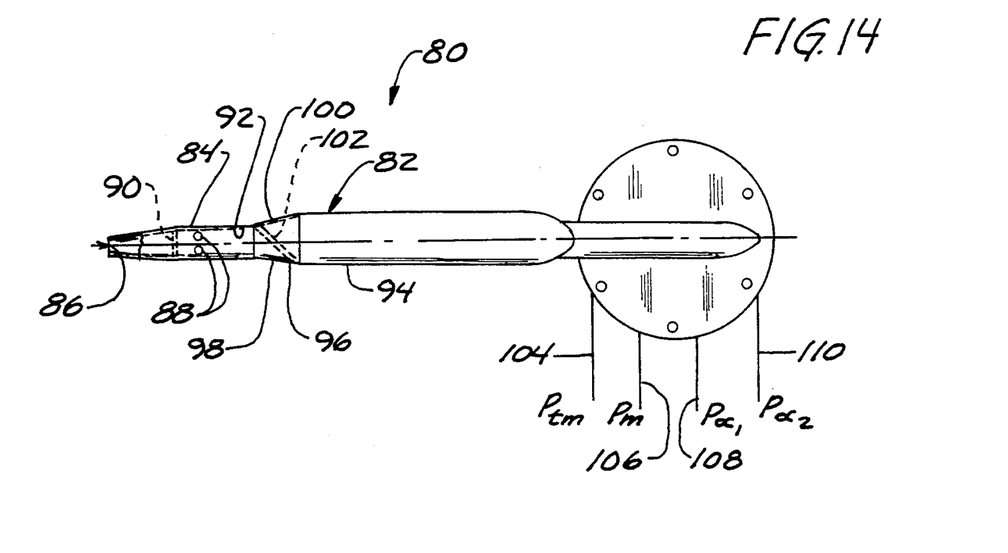
FIG. 14 is a schematic diagram of a multi-functional air data probe utilized in an embodiment of the present invention.

Another embodiment of the present invention has sensors 12 and 14 implemented with a L-shaped multifunctional air data probe as generally indicated at 80 in FIG. 14. Probe 80 measures a local flow angle or an angle of attack of the airflow over the surface of an air vehicle. A suitable multifunctional probe is disclosed in other patents assigned to the assignee of the present application such as the U.S. Pat. Nos. 4,378,696 and 4,836,019. Probe 80 has a barrel 82 with three distinct sections. A first cylindrical section 84 includes a tapered forward end which has an opening or port 86 which is used for sensing the pitot pressure or total measured pressure ($p_{tm}$). A plurality of static sensing ports 88 are arranged around the circumference of the section 84. The static pressure sensing ports 88 are separated with a forward bulkhead 90) and a rear bulkhead 92. The ports 88 are located in a region to provide measured static pressure ($p_m$).

Probe 80 has a rear cylindrical section 94 which has a larger diameter than the diameter of forward cylindrical section 84. A transition section 96 having an expanding diameter in downstream direction joins the first section 84 and the rear section 94. A pair of angle of attack sensing ports 98 and 100 are provided through the wall of transition section 96. The ports 98 and 100 have axis lying in the plane in which the angle of attack is measured and face generally in opposite directions (down and up, respectively). A bulkhead 102 forms separate chambers for ports 98 and 100. The pressure of the first (lower) angle of attack sensing port 98 is represented as $p_{\alpha 1}$ and the pressure at the second (upper) angle of attack sensing port 100 is indicated by $p_{\beta 2}$. The pressure difference between the upper and lower ports indicates angle of attack, as shown in U.S. Pat. No. 4,378,696. Separate pressure carrying conduits 104, 106, 108, and 110 carry the pressure from pitot port 86, static ports 88, and each of the angle of attack sensing ports 98 and 100, respectively.

The local angle of attack is indicated by $\alpha_1 = f[(p_{\alpha 1} - p_{\alpha 2})/q_{cN}]$, where $q_{cN}$ is a normalizing function measured by probe 80. Several methods of deriving the normalizing function are available and explained in other patents assigned to the assignee of the present application such as the above mentioned U.S. Pat. Nos. 4,378,696 and 4,836,019. For example, either of the following two equations could be used to obtain the normalizing function:

$$q_{cN1} = (p_{tm} - p_m)$$

$$q_{cN2} = p_{tm} - \left[\frac{p_{\alpha 1} + p_{\alpha 2}}{2}\right] = (p_{tm} - p_{\alpha 1}) + \left(\frac{p_{\alpha 1} - p_{\alpha 2}}{2}\right)$$

The normalizing function $q_{cN2}$ is preferable so that only two differential pressure measurements need to be made by the transducers 16 and 18 (shown in FIG. 1) to generate the necessary signals to be able to derive the angle of attack. If $q_{cN2}$ is used, then the respective transducer provides the differential measurement of $(p_{tm} - p_{\alpha 1})$ and $(p_{\alpha 1} - p_{\alpha 2})$. Therefore, either a separate angle of attack computer for the computer 20 (shown in FIG. 1) calculates the local angle of attack by the following equation:

$$\alpha_1 = f\left[\frac{p_{\alpha 1} - p_{\alpha 2}}{(p_{tm} - p_{\alpha 1}) + \left(\frac{p_{\alpha 1} - p_{\alpha 2}}{2}\right)}\right]$$

The device of the present invention obtains complete three axis actual flight air data parameters on highly maneuverable aircraft and helicopters. Moreover, for some measurements such as $V_{cx}$ and p redundant measurements are obtainable with the present invention. In the aircraft flight control industry and the weapon delivery industry, obtaining complete three axis air data which is corrected for the mounting location and shape of the air vehicle is important to provide accurate and reliable flight control and management.

Although the present invention has been described with reference to preferred embodiments, workers skilled in the art will recognize that changes may be made in form and detail without departing from the spirit and scope of the invention.

What is claimed is:

1. An apparatus for sensing a parameter of free stream airflow using airflow adjacent an air vehicle, the apparatus comprising:

first sensor means for sensing a longitudinal axial component and a lateral axial component of a parameter of a first local airflow immediately adjacent the first sensor means, the first local airflow being different than the free stream airflow, the first sensor means providing output signals as a function of the local longitudinal and lateral components, the first sensor means being mounted on the air vehicle such that a longitudinal axis of the first sensor means lies in a first plane including a reference longitudinal axis;

second sensor means for sensing a longitudinal axial component and a second axial component substantially perpendicular to the lateral axial component sensed by the first sensor means of a parameter of a second local airflow immediately adjacent the second sensor means, the second local airflow being different than the free stream airflow, the second sensor means providing output signals as a function of the local longitudinal and second axial components, the second sensor being mounted on the air vehicle at a different location than the first sensor means such that a longitudinal axis of the second sensor means lies in a second plane substantially perpendicular to the first plane and including the reference longitudinal axis of the first plane; and correction means for obtaining a signal representing the free stream flow parameter as a function of the output signals from the first and second sensor means.

2. The apparatus according to claim 1 wherein the free stream flow parameter includes a longitudinal axial component, a lateral axial component, and a third axial component perpendicular to the lateral axial component.

3. The apparatus according to claim 2 wherein the free stream flow parameter is an air vehicle air velocity.

4. The apparatus according to claim 1 wherein the free stream flow parameter is an air vehicle angle of attack.

5. The apparatus according to claim 1 wherein the free stream flow parameter is an air vehicle angle of sideslip.

6. The apparatus according to claim 1 wherein the free stream flow parameter is a static pressure.

7. The apparatus according to claim 1 wherein the first and second sensor means each comprise a pitot-static air data sensor.

8. The apparatus according to claim 1 wherein the first and second sensor means each comprise an orthogonal air data sensor capable of measuring airflow data through substantially 360° of flow direction.

9. The apparatus according to claim 1 wherein the correction means comprises a computer on board the air vehicle.

10. The apparatus according to claim 9 wherein the first and second sensor means each sense components from at least two local airflow parameters.

11. The apparatus according to claim 10 wherein the correction means further includes a three-dimensional look-up table stored in the computer.

12. An apparatus for sensing airflow over an air vehicle, comprising:

a first sensor mounted to a first mounting surface on the air vehicle, the air vehicle blocking airflow to the first sensor from a first direction, the first sensor sensing airflow from a first pair of sensed directions other than the first direction at a location spaced away from the first mounting surface and open to airflow from the first pair of sensed directions and providing first sensor outputs representing airflow relative to the first pair of sensed directions;

a second sensor mounted to a selected second mounting surface on the air vehicle at a different location than the first sensor, the air vehicle blocking airflow to the second sensor from a different direction than the first direction, the second sensor sensing airflow from a second pair of sensed directions at a location spaced away from the second mounting surface and open to airflow from the second pair of sensed directions and providing second sensor outputs representing airflow from the second pair of sensed directions;

combining means in the air vehicle for receiving and combining the first sensor outputs and the second sensor outputs and providing a combined flow output signal compensated to substantially eliminate effects caused by the air vehicle blocking airflow to the first sensor from the first direction and airflow to the second sensor from the different direction.

13. The apparatus according to claim 12 wherein the combined flow output signal is representative of the airflow velocity.

14. The apparatus according to claim 12 wherein the combined flow output signal is representative of an air vehicle angle of attack.

15. The apparatus according to claim 12 wherein the combined flow output signal is representative of an air vehicle angle of sideslip.

16. The apparatus according to claim 12 wherein the combined flow output signal is representative of the airflow static pressure.

17. The apparatus according to claim 12 wherein the first and second sensor each comprise a pitot-static air data sensor.

18. The apparatus according to claim 12 wherein the first and second sensor each comprise an orthogonal air data sensor capable of sensing airflow through substantial 360° of flow direction.

19. The apparatus according to claim 12 wherein the combining means comprises a computer on board the air vehicle.

20. The apparatus according to claim 19 wherein the computer further includes a three-dimensional look-up table providing functions of the combining means.

* * * * *